US012583020B2

(12) United States Patent
Barenthin

(10) Patent No.: US 12,583,020 B2
(45) Date of Patent: Mar. 24, 2026

(54) METHOD AND DEVICE FOR PURIFYING FLUIDS IN A CONTAINER

(71) Applicant: STRATEC SE, Birkenfeld (DE)

(72) Inventor: Volker Barenthin, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 60 days.

(21) Appl. No.: 18/419,773

(22) Filed: Jan. 23, 2024

(65) Prior Publication Data

US 2024/0293853 A1 Sep. 5, 2024

(30) Foreign Application Priority Data

Jan. 23, 2023 (LU) ........................................ 103063

(51) Int. Cl.
| | |
|---|---|
| *B08B 9/093* | (2006.01) |
| *B05B 1/08* | (2006.01) |
| *B08B 3/02* | (2006.01) |
| *B08B 9/032* | (2006.01) |
| *G01N 35/02* | (2006.01) |
| *G01N 35/04* | (2006.01) |

(52) U.S. Cl.
CPC .............. *B08B 9/093* (2013.01); *B01L 13/02* (2019.08); *B08B 3/024* (2013.01); *B05B 1/08* (2013.01); *B08B 9/0326* (2013.01); *B08B 2209/08* (2013.01); *G01N 35/02* (2013.01); *G01N 2035/0437* (2013.01)

(58) Field of Classification Search
CPC .......................... G01N 2035/0437; B05B 1/08
See application file for complete search history.

(56) References Cited

U.S. PATENT DOCUMENTS

| | | | | |
|---|---|---|---|---|
| 5,186,760 | A | * | 2/1993 | Rubenzer ................ B01L 13/02 |
| | | | | 134/169 R |
| 5,951,783 | A | | 9/1999 | Kontorovich et al. |
| 2007/0207060 | A1 | * | 9/2007 | Zou .................... G01N 21/6452 |
| | | | | 422/68.1 |
| 2012/0017945 | A1 | | 1/2012 | Gut |
| 2018/0172717 | A1 | * | 6/2018 | Hamada ............. G01N 35/1009 |

(Continued)

FOREIGN PATENT DOCUMENTS

WO WO2020041920 A1 * 3/2020

OTHER PUBLICATIONS

Luxembourg Search Report and Written Opinion for priority application LU103063 issued on Aug. 23, 2023.

*Primary Examiner* — Kaj K Olsen
*Assistant Examiner* — Richard Z. Zhang
(74) *Attorney, Agent, or Firm* — William Gray Mitchell

(57) ABSTRACT

A method and device for purifying fluids in a container and providing a system for the cleaning of a container in automated analyser systems, comprising a pump which is connected to a single injection nozzle, wherein the single injection nozzle is configured to provide an oscillating fluidic jet, as well as a method for the cleaning of a container in automated analyser systems, comprising the following steps of arranging a container in a mount below a single oscillation nozzle; providing a cleaning fluid to a pump, which is connected to a controller and the oscillation nozzle; aligning the oscillating fluidic jet to a surface of the container which is to be cleaned; applying a cleaning fluid through the pump to the oscillation nozzle; and cleaning a surface of the container with the cleaning fluid.

13 Claims, 1 Drawing Sheet

(56) References Cited

U.S. PATENT DOCUMENTS

| | | | |
|---|---|---|---|
| 2018/0201893 A1* | 7/2018 | Munakata | G01N 1/00 |
| 2020/0269259 A1* | 8/2020 | Hinderer | G01F 1/3259 |
| 2021/0301811 A1* | 9/2021 | Many | F04B 43/1253 |

* cited by examiner

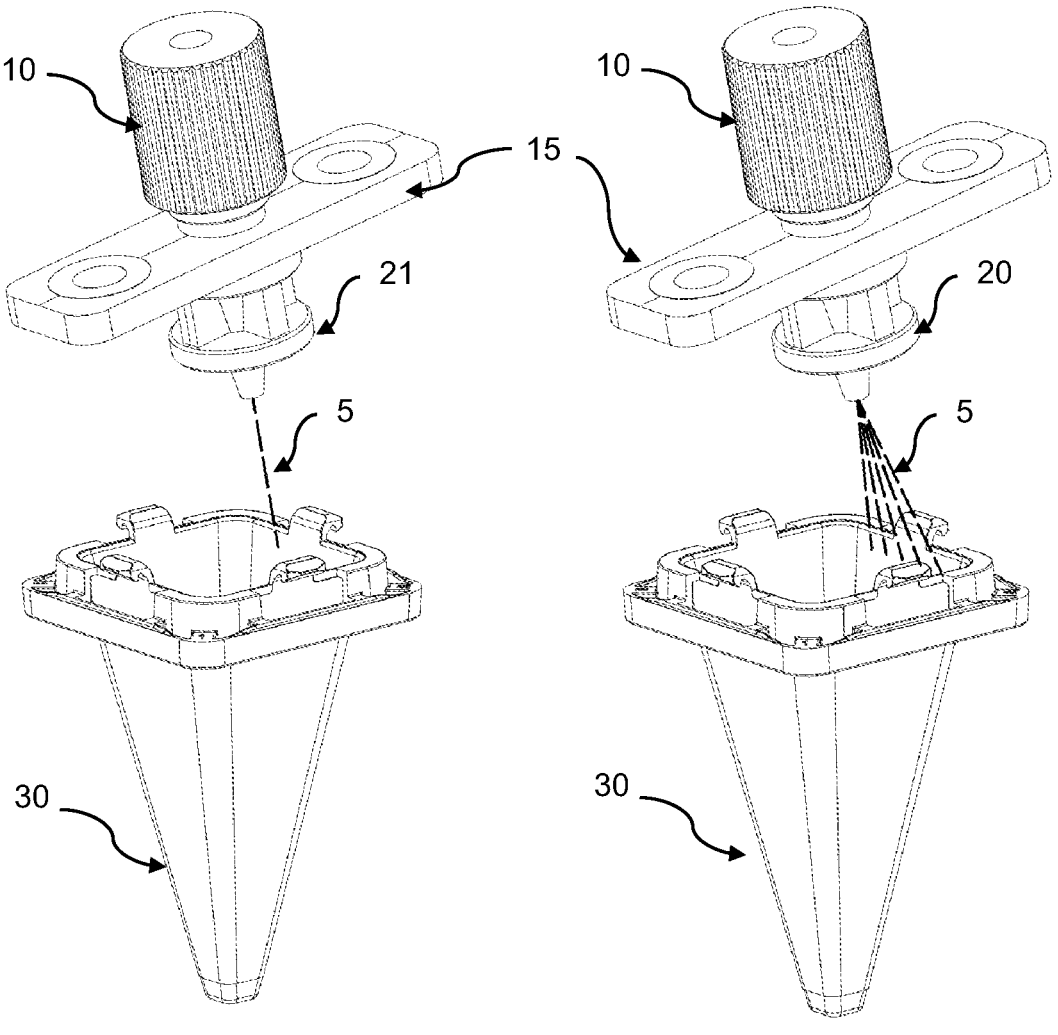

METHOD AND DEVICE FOR PURIFYING FLUIDS IN A CONTAINER

CROSS-REFERENCE TO RELATED APPLICATIONS

The present disclosure claims priority to national Luxembourg patent application No. LU103063 filed on Jan. 23, 2023. The aforementioned application is incorporated herein by reference.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND OF THE DISCLOSURE

Field of the Disclosure

The disclosure relates to a method and device for purifying fluids in a container.

Brief Description of the Related Art

Devices for use in clinical diagnostics and life sciences are produced by a number of companies. For example, STRATEC® SE, Germany, manufactures numerous devices for diagnostic specimen handling and detection for use in automated analyser systems and other laboratory instrumentation.

So called samples will be provided to said systems for their analysis. The analysis requires the processing of the samples by adding or removing fluids. A variety of fluids or reagents are used in human diagnostic analysis systems. Depending on the desired chemical/biological reaction, these fluids are usually used to prepare, purify or process the patient sample for obtaining a result. Chemiluminescence is one example that is used as a reporter for indicating the presence of respective compound.

These devices which are used during a process may use cuvettes as reaction containers. The liquid can be applied via an injector by means of a fluid jet into the container. In addition to the mere delivery of the fluid, a fluid jet may also fulfil further tasks. For example, the kinetic energy of the fluidic jet can be used to achieve the fastest and most effective mixing possible when it impacts into the volume in the cuvette. The fluidic jet can also be used to wash and rinse components of the overall reaction from a container wall.

Published U.S. Patent Application US 2012/0017945 A1 discloses a wash element for washing one or more reusable fluid manipulators is provided comprising at least one nozzle for connection to a fluid pump to generate a fluid jet and at least one deflector surface positioned to deflect the fluid jet towards a washing zone for receiving at least a portion of the fluid manipulator. The deflector surface is being shaped to broaden the fluid jet. The disclosure further relates to a wash station having a cavity provided with one or more wash elements. The disclosure yet further relates to an automated system for manipulating fluids comprising at least one wash station and a controller set up to control washing the fluid manipulator. In a process for washing the reusable fluid manipulator at least a portion of the fluid manipulator is moved in a washing zone, a fluid jet of washing fluid is generated and directed onto a deflector surface shaped to broaden and deflect the fluid jet towards the washing zone.

Published U.S. Pat. No. 5,951,783 discloses a universal washing apparatus for use in washing wells provided in reaction containers such as wells of microtiter plates and the like. The washing apparatus has separate dispense and aspirate manifolds positioned one on top of the other which may be independently lowered or raised with respect to a microtiter plate for performing various wash operations. The washing apparatus uses an indexing mechanism for indexing the well plate relative to the manifolds in the horizontal plane so that the washing apparatus is compatible for washing different well plate configurations.

To achieve the highest possible efficiency in this application, two injectors or so-called dispensing combs (U.S. Pat. No. 5,951,783) can be used. They consist of two or more small cross-section dispensing nozzles and form a fluid curtain across the entire width of the reaction carrier when the reagents are dispensed.

However, due to a large number of dispensing needles in a comb, a uniform dispensing cannot be guaranteed when using only one precision pump. Thus, due to small deviations, e.g. clogging of individual nozzles, no or no correct volume will be dispensed.

Alternatively, the use of a separate pump for each individual nozzle would be conceivable. Nevertheless, disadvantages of known solutions from the prior art relate to an unreliable or unsafe liquid distribution when using multiple nozzles with a common pump. Further, increased cost and space requirements result from using separate pumps for each nozzle or add components for moving a nozzle (US 2012/0017945 A1).

Thus, there is a need for a device and method allowing a reliable cleaning of containers with a minimal constructional effort.

SUMMARY OF THE DISCLOSURE

The present disclosure provides a system for the cleaning of a container in automated analyser systems, comprising a pump which is connected to a single injection nozzle, wherein the single injection nozzle is configured to provide an oscillating fluidic jet.

The system according to the present disclosure may comprise in an embodiment a mount for a container.

Another embodiment relates to a system, wherein the baseplate comprises a fitting for connecting a hose which is connected with the opposite end to the pump.

Another aspect of a system according to the present disclosure relates to the injection nozzle which is mounted movable to a base plate arranged between a fitting and the oscillation nozzle The system may also comprise a base plate which is carrying oscillation nozzle and fitting is mounted to an automated analyser system.

The pump of a system according to the present disclosure can be connected to a controller comprising parameters for controlling acceleration and deceleration, volume flow and direction of the oscillating fluidic jet, wherein the parameters can be adjusted to fluidic properties of a cleaning fluid.

It is also envisaged that the parameters of a system according to the present disclosure configure the pump to apply a defined amount of the cleaning fluid.

The system may provide that the cleaning fluid is retracted from the oscillation nozzle after applying the intended amount of the cleaning fluid.

Another object of the present disclosure relates to a method for the cleaning of a container in automated analyser systems, comprising the following steps:

Arranging a container in a mount below a single oscillation nozzle;

Providing a cleaning fluid to a pump, which is connected to a controller and the oscillation nozzle;

Aligning the oscillating fluidic jet to a surface of the container which is to be cleaned;

Applying a cleaning fluid through the pump to the oscillation nozzle; and

Cleaning a surface of the container with the cleaning fluid.

The method may in an embodiment comprise the step of moving the oscillation nozzle for cleaning of an increased area of the container.

The method may further comprise the step that the cleaning of the container is controlled by parameters which are stored in the controller.

Another aspect of the method according to the present disclosure relates to a step, wherein the parameters which are stored in the controller comprise acceleration and deceleration, volume flow and direction of the oscillating fluidic jet.

The method may comprise the step of retracting the cleaning fluid after applying the intended amount of the cleaning fluid.

Still other aspects, features, and advantages of the present disclosure are readily apparent from the following detailed description, simply by illustrating preferable embodiments and implementations. The present disclosure is also capable of other and different embodiments and its several details can be modified in various obvious respects, all without departing from the spirit and scope of the present disclosure. Accordingly, the drawings and descriptions are to be regarded as illustrative in nature, and not as restrictive. Additional objects and advantages of the disclosure will be set forth in part in the description which follows and in part will be obvious from the description, or may be learned by practice of the disclosure.

SUMMARY OF THE FIGURES

The disclosure will be described based on figures. It will be understood that the embodiments and aspects of the disclosure described in the figures are only examples and do not limit the protective scope of the claims in any way. The disclosure is defined by the claims and their equivalents. It will be understood that features of one aspect or embodiment of the disclosure can be combined with a feature of a different aspect or aspects of other embodiments of the disclosure, in which:

FIG. 1 shows in its left part a single nozzle with a point-shaped jet and on its right part an oscillating nozzle with a fan jet.

DETAILED DESCRIPTION OF THE DISCLOSURE

The technical problem is solved by the independent claims. The dependent claims cover further specific embodiments of the disclosure.

The term "container" within the meaning of the present disclosure relates to any device that is suitable for receiving fluid. Such a container can be a receptacle like a vessel, a bottle, a cuvette, or a recess. A flat surface like a microscope slide represents also a container in the context of the present disclosure.

The term "fluid" refers with the meaning of the present disclosure to a liquid, a gas, or a mixture thereof which may comprise solids like particles.

The term "oscillation nozzle" within the meaning of the present disclosure refers to a nozzle which provides a fluid fan due to the oscillation of the fluid leaving the nozzle.

In order to avoid the above-mentioned disadvantages, the present disclosure is based on the use of a single nozzle and a single precision pump. However, several problems can arise:

During the reaction process, the injection point, i.e. the target position at which the fluidic jet should impinge, plays a decisive role. However, exactly this point is strongly dependent on a chain of tolerances which ultimately result from the position of the container, like a cuvette, and the injector in relation to the container.

Under certain circumstances, larger areas may have to be covered by only one fluidic jet. The cross-section of the injector would have to be adjusted for achieving this. However, this cannot be done arbitrarily, as otherwise no fluidic jet can be formed with a defined dispensing volume.

Depending on the parameters of the dispensing fluidic jet, e.g. the position of the injection point, the volume flow, etc., a possibly desired mixing or homogeneous distribution of the reagent(s) can only take place to a limited extent.

For combining the advantages of a single dispensing nozzle and the homogeneous or large-area distribution of a comb, an oscillating nozzle is used in a device according to the present disclosure. Said nozzle starts to oscillate due to a flow instability as soon as the flow is initiated. It is an advantage that the nozzle does not require any moving parts. The oscillation can be adjusted via the geometry of the nozzle.

When dispensing fluids into the reaction carrier, all related and necessary parameters are already known, like:

Volume to be dispensed;

Dispensing speed (volume flow);

Width of the fan and thus the distance of the oscillation nozzle to the surface of the reaction carrier.

The precision pump initiates delivery of the required volume. Oscillation begins when the fluid starts flowing through the oscillating nozzle, and each fan is formed. If a fan is now positioned at or above the injection point, a line contact results from which the fluid can flow evenly over the contact surface.

If the oscillating nozzle is moved linearly, an almost rectangular area can be actively reached.

Residues may form at the ends of the dispensing nozzles when certain problematic reagents are dispensed. Such residues may cause blockages or an insufficient dispensing, for example. The use of a single nozzle may be advantageous over the use of a dispensing comb: If the functionality of the precision pump allows, it can be retracted by a certain fluidic amount after dispensing has been completed. Thus, any residual volume is drawn out of the oscillating nozzle and no residue can form at its end. With several individual nozzles, on the other hand, residues could form or remain at individual nozzle openings.

Due to the proportionality of the volume flow to the oscillation frequency of the nozzle, the freely selectable operating parameters of the precision pump (acceleration and deceleration, volume flow, reverse) and an optional linear drive of the dispensing nozzle, homogeneous dispensing over the entire surface of the reaction carrier can be achieved. The parameters can also be adjusted to the fluidic properties of the reagent (viscosity, surface tension, contact angle)

FIG. 1 shows in its left part a single nozzle 21 with a point-shaped jet and on its right part an oscillating nozzle 20 with a fan jet according to the present disclosure.

A fitting 10 is connected to a base plate 15 and the oscillation nozzle 20 is mounted to the base plate 15 and fluidly connected to the fitting 10. A container 30, which is a cuvette in FIG. 1 is arranged below the oscillation nozzle 20.

The fluid jet 5 leaves the oscillation nozzle 20 as a fan. The oscillation nozzle 20 or the container 30 may be arranged movable so that not only a line of the fluidic jet 5 reaches the surface of the container 30, but an area of the container's surface will be reached by the fan of the fluidic jet 5.

The advantage of a system and a method according to the disclosure is the provision of a robust system with only one nozzle, which is maintenance-free without any moving parts, for the cleaning of container, respectively the surfaces of a container.

The foregoing description of the preferred embodiment of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiment was chosen and described in order to explain the principles of the disclosure and its practical application to enable one skilled in the art to utilize the disclosure in various embodiments as are suited to the particular use contemplated. It is intended that the scope of the disclosure be defined by the claims appended hereto, and their equivalents. The entirety of each of the aforementioned documents is incorporated by reference herein.

REFERENCE NUMERALS 5 fluidic jet
10 fitting
15 base plate
20 oscillation nozzle
21 nozzle
30 container

What is claimed is:

1. A system for cleaning a container in an automated analyser, such system comprising
a mount configured to hold the container;

a base plate positioned above the mount;
a pump; and
a single injection nozzle connected to the pump and mounted movably to the base plate, wherein the single injection nozzle is configured to provide an oscillating fluidic jet in the form of a fluidic fan due to oscillation of fluid leaving the single injection nozzle resulting from a flow instability when flow of the fluid is initiated.

2. The system of claim 1, wherein the base plate comprises a fitting for connecting a hose between the fitting and the pump.

3. The system of claim 1, wherein the base plate is arranged between a fitting and the single injection nozzle.

4. The system of claim 1, wherein the pump and the base plate carrying the single injection nozzle are mounted to the automated analyser.

5. The system of claim 1, wherein the pump is connected to a controller comprising parameters for controlling acceleration, deceleration, volume flow and direction of the oscillating fluidic jet.

6. The system of claim 5, wherein the parameters for controlling acceleration, deceleration, volume flow and direction of the oscillating fluidic jet are adjusted according to viscosity, surface tension and contact angle of a cleaning fluid.

7. The system of claim 6, wherein the parameters configure the pump to apply a defined amount of the cleaning fluid.

8. The system of claim 1, wherein a cleaning fluid is retracted from the single injection nozzle after applying an intended amount of the cleaning fluid.

9. A method for cleaning a container in an automated analyser, comprising the following steps:
Providing the system of claim 1;
Arranging the container in the mount below the single injection nozzle;
Applying a cleaning fluid through the pump to the single injection nozzle; and
Cleaning a surface of the container with the cleaning fluid ejected from the single injection nozzle.

10. The method of claim 9, wherein the single injection nozzle is moved for cleaning of an increased area of the container.

11. The method of claim 9, wherein the cleaning of the container is controlled by parameters stored in a controller connected to the pump.

12. The method of claim 11, wherein the parameters stored in the controller comprise acceleration, deceleration, volume flow and direction of an oscillating fluidic jet provided by the single injection nozzle.

13. The method of claim 9, further comprising the step of retracting the cleaning fluid after applying an intended amount of the cleaning fluid.

\* \* \* \* \*